United States Patent

[11] 3,626,910

| [72] | Inventors | Ferdinand Anton Ernst Porsche<br>Stuttgart-Nord;<br>Paul Breyer, Rutesheim, both of Germany |
|---|---|---|
| [21] | Appl. No. | 778,561 |
| [22] | Filed | Nov. 25, 1968 |
| [45] | Patented | Dec. 14, 1971 |
| [73] | Assignee | Firma Dr. Ing. h. c. F. Porsche K.G.<br>Stuttgart-Zuffenhausen, Germany |
| [32] | Priority | Dec. 20, 1967 |
| [33] | | Germany |
| [31] | | P 15 76 323.2 |

[54] IGNITION AND INJECTION CONTROL FOR INTERNAL COMBUSTION ENGINE
3 Claims, 5 Drawing Figs.

[52] U.S. Cl. .................................................. 123/32 EA,
123/119, 123/148 E
[51] Int. Cl. .................................................. F02m 57/00

[50] Field of Search .................................................. 123/32 E,
32, 119, 139.17, 140.3, 148 E

[56] References Cited
UNITED STATES PATENTS

| 2,815,009 | 12/1957 | Pribble | 123/32 E (1) |
|---|---|---|---|
| 2,918,913 | 12/1959 | Guiot | 123/32 E (1) |
| 3,020,897 | 2/1962 | Sekine et al. | 123/148 E |
| 3,430,616 | 3/1969 | Glockler et al. | 123/32 E (1) |
| 3,435,809 | 4/1969 | Bassot et al. | 123/119 |

*Primary Examiner*—Laurence M. Goodridge
*Attorney*—Craig, Antonelli & Hill

ABSTRACT: An external ignition internal combustion engine is provided with semiconductor controls for the fuel injection and spark plug ignition, which provide a plurality of injections and ignitions for each cycle of each cylinder at low speeds, which plurality reduces in number in correspondence with increased engine speed.

PATENTED DEC 14 1971
3,626,910
SHEET 1 OF 3
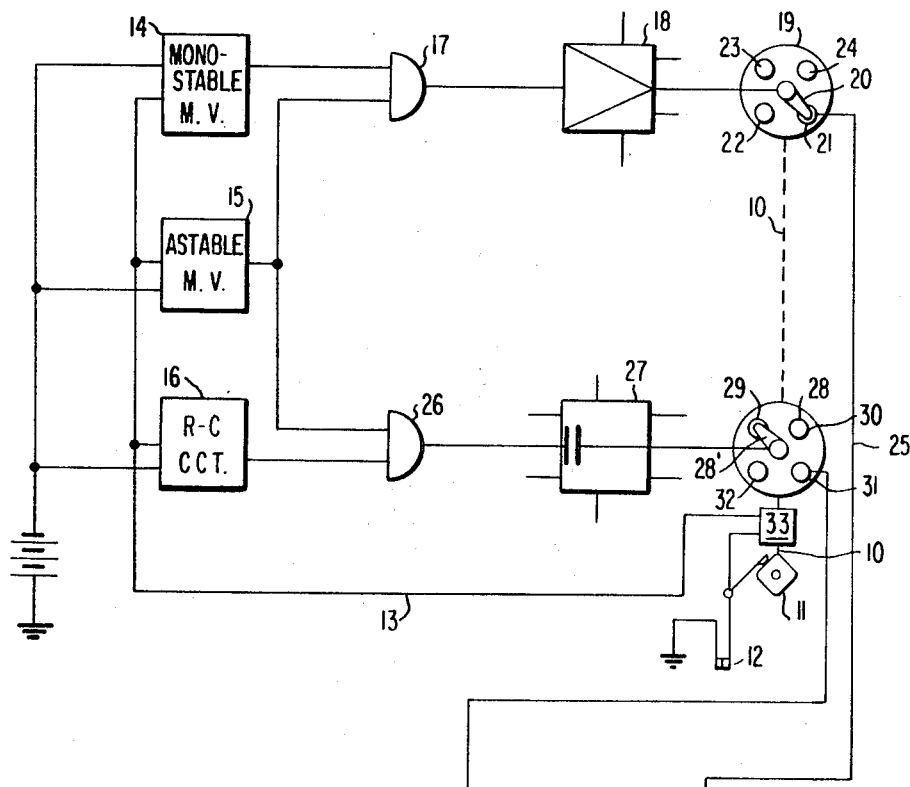
FIG.1
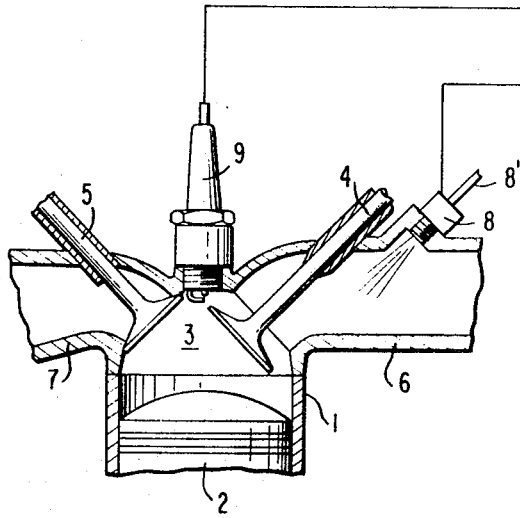
INVENTORS
FERDINAND ANTON ERNST PORSCHE
AND PAUL BREYER
BY Craig, Antonelli, Stewart & Hill
ATTORNEYS

IGNITION AND INJECTION CONTROL FOR INTERNAL COMBUSTION ENGINE

BACKGROUND OF THE INVENTION

It is known that the fuel-air mixture in the combustion chamber of an internal combustion engine with external ignition is not homogeneous, and thus it is impossible to attain a uniform combustion rate and ignition capacity of the mixture. This inherent disadvantage is particularly great with respect to an injection internal combustion engine wherein the fuel is injected into the suction pipe a short distance upstream of the intake valve. In the latter case, the fuel jet is so compact that, particularly when the airflow rate in the suction intake pipe is low, for example, at low-engine speeds, only an insufficiently homogeneous fuel-air mixture can be formed so that the combustion is correspondingly very poor.

It has been proposed to provide an internal combustion engine that has the mixture prepared outside of the cylinder with two spark plugs for each combustion chamber, which spark plugs are fed by a transistor-equipped ignition system. Such a device requires a cylinder head having a special and complicated construction, which is complex and expensive to produce. In addition, transistor ignitions result in only short, though strong, ignition sparks.

SUMMARY OF THE INVENTION

It is an object of the present invention to improve the mixture preparation and ignition in injection internal combustion engines with external ignition.

The above objective is accomplished by the present invention, particularly at low-engine speeds, by providing a plurality of fuel injections and ignitions for each cycle of each cylinder. By dividing the injection for each cycle into a plurality of separate fuel injections for each cylinder, there results an advantageous additional turbulent mixing of the fuel with the combustion air. Advantageously, the mixture is ignited by means of multiple-spark ignition. This multiple-spark ignition provides for the optimum igniting of the rotating mixture, safely and uniformly, so that a combustion process of a far better quality is obtained.

The number of individual fuel injections and ignitions, for each cycle, are advantageously varied in correspondence with one or more operating characteristics of the internal combustion engine. It is recognized that the mixture formation becomes more favorable with an increase in speed of rotation of the internal combustion engine. Thus, in accordance with the present invention, the number of separate injections is, for example, dependent upon the speed of rotation of the internal combustion engine; particularly, the number of individual injections and the number of individual ignitions, for each cycle, are reduced in proportion to each other with an increasing engine speed, so that, at the highest speed of rotation only one injection and one ignition takes place for each cycle of each cylinder. The ignition devices for all of the cylinders of the internal combustion engine are controlled by a semiconductor equipped ignition circuit and the injection devices of all of the cylinders of the internal combustion engine are controlled by means of a semiconductor equipped electronic circuit. These circuits have a common pulse generator to provide a simplified and economic construction. Electronic switches are provided in each of the control circuits, which switches are controlled by the pulse generator; the electronic switches are preferably AND gates. In the circuit for the injection devices the AND gate associated therewith is controlled by the pulse generator and a regulating device for the injection quantity. The AND gate associated with the ignition device control circuit is controlled by the pulse generator and a device limiting the number of pulses, which latter device is dependent on the engine speed.

BRIEF DESCRIPTION OF THE DRAWING

Further objects, features and advantages of the present invention will become more clear from the following description of the drawing, wherein:

FIG. 1 is a diagrammatic illustration of a cylinder of an injection internal combustion engine in combination with electronic control circuits for controlling the fuel injection nozzle and the spark plug ignition device;

DETAILED DESCRIPTION OF THE INVENTION

Figure 2:
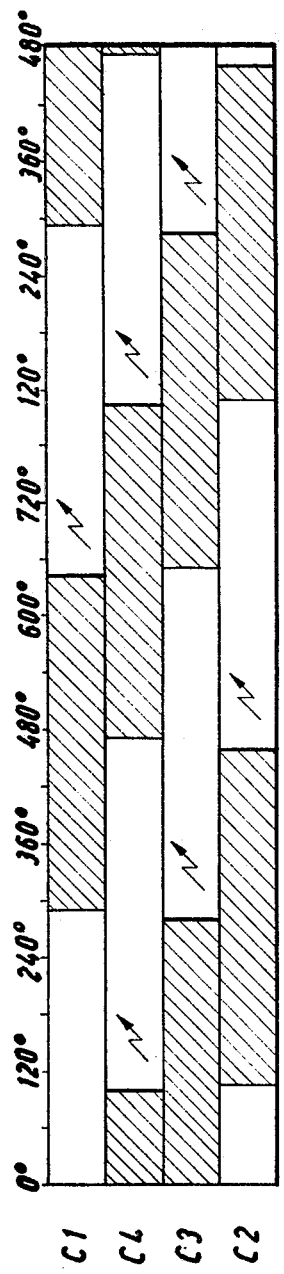
FIG. 2 is a diagram wherein the relative positions of the opening periods of the intake valves and the ignition points are illustrated for a four-cylinder injection internal combustion engine.

The ignition and injection control system shown in FIG. 1 is designed for a four-cylinder internal combustion engine; for purposes of simplicity, the figure shows only one cylinder of the internal combustion engine in schematic form. The cylinder 1 includes a piston 2 and a combustion chamber 3, provided with an intake valve 4 and an exhaust valve 5, which are respectively in the intake pipe 6 and the exhaust pipe 7. A fuel injection nozzle 8 is mounted in the intake pipe 6 for connection with a pressurized fuel line 8'. The nozzle is provided with an electrically controlled valve for injecting predetermined quantities of fuel toward the intake valve 4 in response to an electric control signal, to form a fuel-air mixture that will be sucked into the combustion chamber 3 of the cylinder 1; the injection process takes place as soon as the intake valve opens the passage into the combustion chamber, for each cycle. The mixture in the combustion chamber 3 is ignited by means of the spark plug ignition device 9. The injection nozzle 9 includes an electromagnetically controlled valve, which is known per se.

The supply voltage for the electronic control circuits of FIG. 1 is provided by means of a conventional battery 34 that is normally found in the vehicle. The control circuits are constantly proportionately excited in dependence on the engine speed, for example the speed of rotation of the crankshaft of the internal combustion engine. For this purpose, a cam and follower arrangement 11 is driven by a control shaft 10 for making and breaking the electrical contacts 12 in proportion to the engine speed. Thus, the current supplied by the fluctuating switch 12 will be supplied to the line 13 in a fluctuating manner dependent upon the speed of rotation of the engine.

The wire 13 provides the fluctuating current to and for operation of a device 14 regulating the amount of fuel injected, a pulse generator 15 and a pulse number limiting device 16. The fuel quantity regulating device 14 is preferably a monostable multivibrator producing pulses having a predetermined duration, which duration is dependent preferably on the position of the gas pedal, the speed of rotation of the internal combustion engine, the temperature, and any desired additional operating characteristics of the internal combustion engine, singly or in combination. The pulse generator 15 is an astable multivibrator that generates pulses at uniform intervals of, for example, 1 ms. The pulse number limiting device 16 preferably is a timing circuit consisting of a capacitor and a resistor that is dependent upon the engine speed of rotation.

The fuel quantity regulating device 14 and the pulse generator 15 have outputs that are fed to an electronic switch, preferably an AND-gate 17. The AND-gate 17 will transmit pulses only if it is actuated simultaneously by the fuel quantity regulating device 14 and the pulse generator 15, which transmitted pulses will pass through an amplifier 18 to a distributor 19. The distributor 19 is of a conventional construction provided with a rotating finger 20 driven by means of the control shaft 10, which finger will sequentially electrically connect the amplifier 18 to one of the contacts 21, 22, 23, 24. As illustrated in FIG. 1, the contact 21 is closed so that the fuel injection nozzle 8 associated with the cylinder 1 is electrically actuated by means of the wire 25 in response to a control signal passing through the amplifier 18; upon actuation, the electromagnetically controlled valve in the nozzle 8 will open to allow fuel under pressure in the line 8' to be introduced into the intake pipe 6 in rhythm with the pulses from the generator 15 and in amounts as determined by the device 14. The additional contacts 22–24 are associated with similarly constructed injection nozzle for the remaining three cylinders of the four-cylinder internal combustion engine, which complete internal combustion engine is not shown for purposes of simplicity. The distributor illustrated is of a mechanical variety, known per se, and it is contemplated that the pulses could also be distributed electronically. The above-described system is the fuel-injection control device.

The ignition-control device will now be described in detail. A further AND-gate 26 is provided with pulses from the common pulse generator 15 and from the pulse number limiting device 16 that is dependent on the engine speed; the AND-gate 26 transmits pulses to an ignition device 27, preferably a high voltage capacitor, only when it receives signals simultaneously from the devices 15 and 16. An ignition distributor 28, similar to the above-described distributor 19, will distribute the control signals passing through the capacitor 27 to the individual ignition devices of the four cylinders, For this purpose, the ignition distributor 28 has contacts 29, 30, 31 and 32, of which contact 31 is associated with the spark plug 9 of the cylinder 1. The remaining contacts 29, 30 and 32 are respectively assigned to the spark plugs of the remaining three cylinders of the four-cylinder internal combustion engine. The spark plug of the cylinder of the internal combustion engine that is connected by one of the contacts of the movable finger 28' to the capacitor 27 will produce ignition sparks, which sparks will be in frequency with the pulse generator 15 and of a duration corresponding to the control of the limiting device 16.

It is desirable to vary the instant of ignition for each cycle in dependence on the engine speed of rotation; for this purpose an ignition timing device 33 is provided, which is preferably equipped with semiconductors. The ignition timing device is operated or influenced by rotation of the control shaft 10.

Ignition timing is controlled in that the breaker contacts of the switch 12 are designed in cooperation with the cam unit 11 to produce the greatest spark advance with respect to engine rotation that will be needed at any time. The pulses produced by the switch 12 will pass through the timing device 33 before reaching the wire 13; the timing device 33 will delay transmission of the pulses from the switch 12 to the wire 13 for a period correlated to the engine speed of rotation as determined by rotation of the control shaft 10.

As a specific example of the operation of the present invention, when the internal combustion engine is idling at approximately 1,000 r.p.m., there will take place four individual separate fuel injections and four individual separate ignitions for each cycle of the cylinder 1. A corresponding operation will occur in the other cylinders of the internal combustion engine. With an increase in the engine speed, the number of these individual injections and ignitions for each cycle will decrease, until, for example starting with a speed of rotation of the internal combustion engine of more than 3,500 r.p.m., there will take place only one fuel injection and only one fuel ignition for each cycle of the cylinder 1. Of course, other specific operating parameters are contemplated within the teachings of the present invention.

In FIG. 2, the diagram shows the open periods for the intake valves (the shaded area) for each of the cylinders, (in firing order C1, C4, C3, C2) and correlated with the degrees of crankshaft rotation for more than one cycle.

Figure 3:
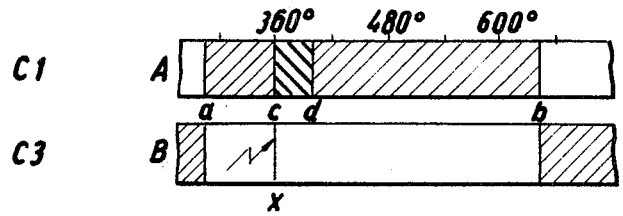
FIG. 3 shows excerpts from the diagram of FIG. 2 under different conditions, on an enlarged scale.

In FIG. 3, there is shown an excerpt from the diagram of FIG. 2. The excerpt shows the opening period of the intake valve for cylinder 1 and the instant of ignition for cylinder 3 with respect to the intake stroke and the power stroke, respectively. The duration of the fuel injection is superimposed on the intake valve opening period. Again, the degree indications refer to the crank angles. In field A of FIG. 3, $a$ indicates the starting of the opening movement of the intake valve for the cylinder 1, and $b$ designates the end of the closing movement of the intake valve. The zone from $c$ to $d$ represents the duration of the fuel injection, during idling of the internal combustion engine. The mark $x$ in the field B illustrates the instant of ignition for cylinder number 3. Zones A' and B' in FIG. 3 represent the conditions mentioned above but at the maximum speed of the internal combustion engine and maximum load of the internal combustion engine for the same cylinders, that is, the maximum duration of fuel injection and maximum spark advance. The zone $a'$–$b'$ for the valve open period remains the same, the zone $c'$–$d'$ representing the duration of fuel injection has become larger, and the instant of spark ignition $x'$ has been advanced in time. From a comparison of FIGS. 2 and 3, it is seen that two cylinders are simultaneously controlled by the electronic control device of the present invention, namely, the injection nozzle of the cylinder 1 and the ignition device of the cylinder 3; the injection nozzle of cylinder 4 and the ignition device of cylinder 2; the injection nozzle of cylinder 3 and the ignition device of cylinder 1; and finally the injection nozzle of cylinder 2 and the ignition device of cylinder 4. With respect to the illustrated idling conditions of FIG. 3 (A,B) only the fuel injection duration has been shown, being understood that a plurality of injection pulses exists within this period, and only the instant of ignition has been shown, being understood that a plurality of separate ignition pulses will follow.

Figure 4:
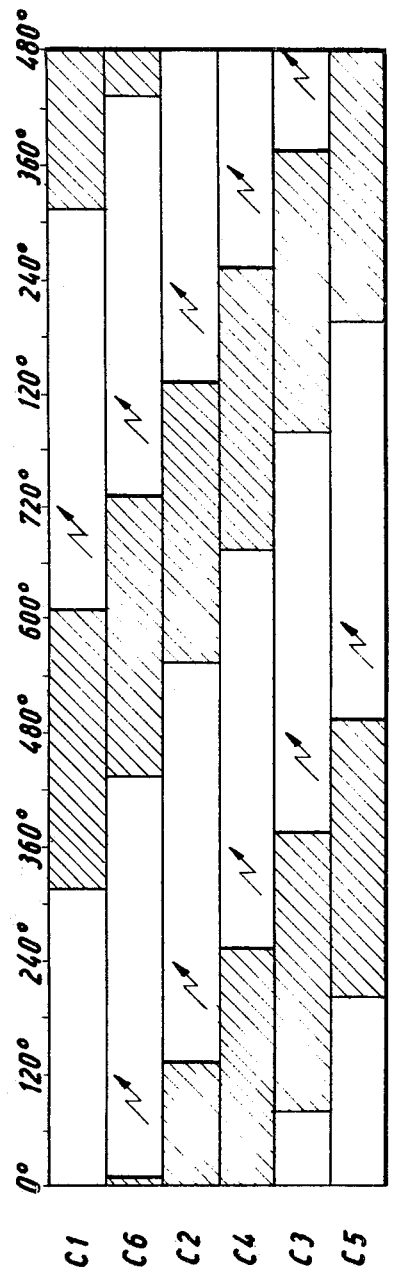
FIG. 4 is a diagram similar to the diagram of FIG. 2, but for a six-cylinder injection internal combustion engine.
Figure 5:
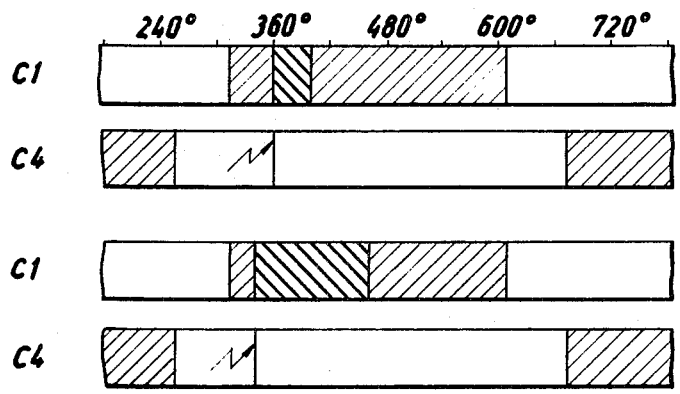
FIG. 5 is an excerpt, similar to FIG. 3, but taken from the diagram of FIG. 4.

FIGS. 4 and 5 show diagrams corresponding to those of FIGS. 2 and 3, respectively, but for a six-cylinder injection internal combustion engine with an assumed opening sequence of the intake valves of C1, C6, C2, C4, C3, C5. The firing order of the six cylinders C, in this connection, is C4, C3, C5, C1, C6, C2. The cooperation between the injection and ignition is, in principle, the same as described in the mode of operation of the four cylinder engine with reference to FIGS. 2 and 3. Therefore, no further explanation of the six-cylinder device is necessary. It is contemplated that the control of the present invention may be used with internal combustion engines having one or more cylinders, adapting the above principles thereto. Further modifications, variations and embodiments are contemplated without limit to the specific preferred embodiments that have been described and shown in detail only for purposes of illustration.

It is claimed:
1. A system for use with an internal combustion engine having each cylinder provided with a fuel injection nozzle having an electrically operated valve responsive to connection with a source of electric energy to open and inject fuel and a spark plug connected with an ignition device capable of generating a high voltage to fire the spark plug and ignite the fuel injected during each cycle of cylinder operation, said system comprising:
   means for producing a fluctuating current in timed relation to the relation of said engine,
   electronic control circuits connected with said first means and responsive to said fluctuating current for generating a plurality of pulses to first and second outputs, said control circuit including:
   pulse generator means for generating a first plurality of pulses timed with engine rotation in response to the receipt of said fluctuating current,
   a monostable multivibrator for simultaneously producing a pulse of predetermined duration in response to receipt of said fluctuating current,
   a pulse number limiting device also responsive to said fluctuating current for generating a number of pulses at uniform intervals dependent on the engine speed,
   an AND gate for receiving the outputs of said pulse generator and said monostable multivibrator for producing a multiplicity of pulses of a predetermined duration constituting said first output which when applied to said connection between said source and said valve produces a plurality of valve openings to inject fuel during each charging cycle of each engine cylinder, and an AND-gate for receiving the outputs of said pulse generator and said pulse number limiting device for producing a multiplicity of pulses at uniform intervals constituting said second output which when applied to said ignition device produces a number of sparks from said spark plug during each cycle dependent on engine speed to fire the charge previously injected.

2. The system according to claim 1 wherein said pulse number limiting device is a resistance-capacitor timing circuit.

3. A system according to claim 1, wherein said pulse generator means comprises an astable multivibrator.

* * * * *